UNITED STATES PATENT OFFICE.

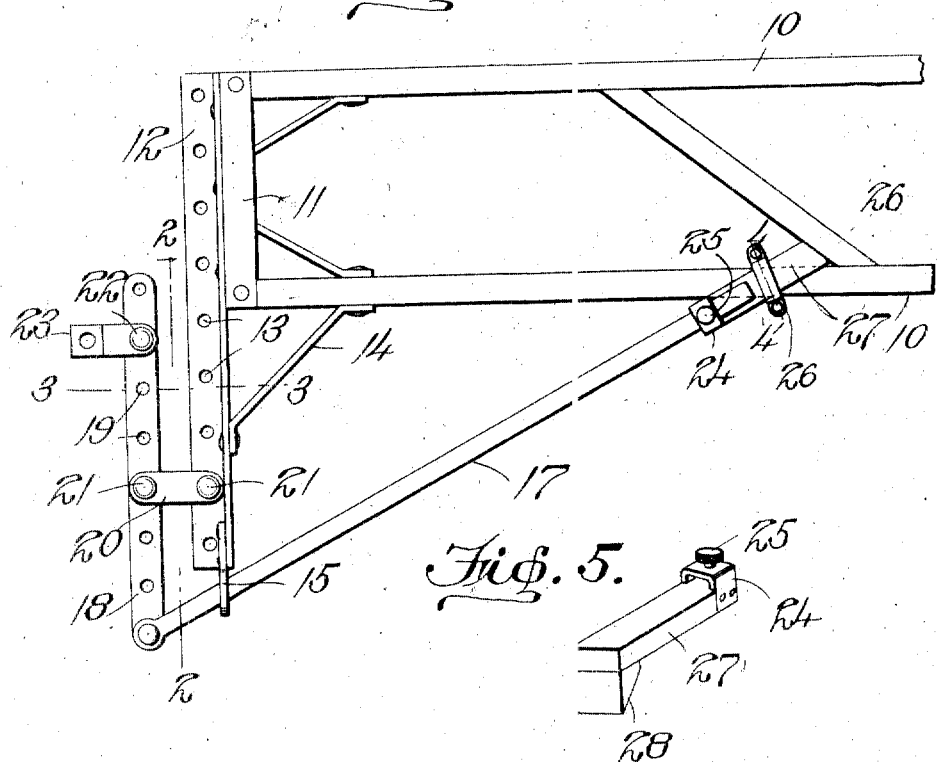

HARVEY O. LANTZER, OF AURORA, NEBRASKA.

GANG-PLOW HITCH.

1,216,142.

Specification of Letters Patent.

Patented Feb. 13, 1917.

Application filed October 2, 1916. Serial No. 123,366.

*To all whom it may concern:*

Be it known that I, HARVEY O. LANTZER, a citizen of the United States, residing at Aurora, in the county of Hamilton, State of Nebraska, have invented certain new and useful Improvements in Gang-Plow Hitches; and I do hereby declare the following to be a full, clear, and exact description of the invention, such as will enable others skilled in the art to which it appertains to make and use the same.

This invention relates to plow hitches and has special reference to a plow hitch for gang plows.

One important object of the invention is to improve the general construction of devices of this character.

A second important object of the invention is to provide an improved form of plow hitch adapted for adjustable connection to the beams of a gang plow, in such manner as to greatly reduce or eliminate the side draft usual in such plows.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a plan view showing the improved plow hitch applied to a pair of plow beams.

Fig. 2 is a section on the line 2—2 of Fig. 1.

Fig. 3 is a section on the line 3—3 of Fig. 1.

Fig. 4 is a section on the line 4—4 of Fig. 1.

Fig. 5 is a view of the clamp and wedge piece.

In the embodiment of the invention herein illustrated there has been shown a pair of plow beams 10 which are connected at their forward ends in the usual manner as indicated at 11.

The plow hitch comprises an angle iron 12 which is secured to the front of the beams 10 and extends laterally to one side of said beams, the horizontal leg of the angle iron being provided throughout its length with spaced bolt receiving openings 13. The projecting end of the angle iron 12 is braced to one of the beams 10 by means of a diagonal brace 14. At the outer end of the angle clevis there is fixed a vertical iron 15 having a vertically spaced series of slots 16 therein and passing through one of these slots is a bar 17 which is pivotally connected at its forward end to an evener bar or lever 18 provided throughout its length with bolt receiving openings 19 spaced similarly to the openings 13. This evener bar is connected to the angle iron 12 at a suitable distance from the ends of said bar and angle iron by means of a pair of straps 20, bolts 21 passing through the ends of these straps and selected openings 13 and 19. Furthermore, a bolt 22 pivotally connects a clevis 23 with one of the openings 19.

The bar 17 extends rearwardly across one of the beams 10 and is there adjustably connected to said beams by means of a clamping collar 24 carrying a set screw 25. A collar 26 also surrounds a wedge piece 27, the arrangement being such that the collar clamps the piece 27 to the beam, thus holding the wedge 28 firmly in adjusted position, in the angle between members 10 and 26.

Thus by means of the adjustment of the rear end of the rod 17 the outward push on the beam may be regulated, the force of the push being also regulated by varying the position of the straps 20. Moreover by reason of the slotted end member the height of the hitch may also be regulated.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

The combination with a plurality of plow beams; of a cross bar secured to the forward ends of said beams and projecting laterally from one side thereof, an equalizing lever, there being correspondingly spaced openings in the cross bar and lever, links extending between said cross bar and lever, pivot bolts connecting said links to selected openings in the cross bar and lever, a bar having its front end pivotally connected to the outer end of said lever, a clevis at the inner end of said lever, a collar slidably mounted on one of said beams and slidably receiving the rear end of said last bar, a wedge interposed between said collar and beam and a set screw carried by the collar and positioned to clamp the last bar, the beam and the wedge together.

In testimony whereof, I affix my signature, in the presence of two witnesses.

HARVEY O. LANTZER.

Witnesses:
CLAUDE M. LANTZER,
W. P. LANTZER.